(12) United States Patent
Wolf

(10) Patent No.: US 6,621,582 B2
(45) Date of Patent: Sep. 16, 2003

(54) OPTICAL METROLOGY SYSTEM AND METHOD EMPLOYING LASER-SERVER SUPPLYING LASER ENERGY TO DISTRIBUTED SLAVE METROLOGY HEADS

(75) Inventor: R. Gregory Wolf, Hackettstown, NJ (US)

(73) Assignee: Rudolph Technologies, Inc., Flanders, NJ (US)

( * ) Notice: Subject to any disclaimer, the term of this patent is extended or adjusted under 35 U.S.C. 154(b) by 226 days.

(21) Appl. No.: 09/750,996

(22) Filed: Dec. 29, 2000

(65) Prior Publication Data

US 2002/0030825 A1 Mar. 14, 2002

Related U.S. Application Data

(60) Provisional application No. 60/231,611, filed on Sep. 11, 2000.

(51) Int. Cl.$^7$ ................................................ G01B 11/24
(52) U.S. Cl. ...................... 356/601; 356/632; 702/83
(58) Field of Search ................................. 356/601, 630, 356/632; 703/82, 83, 84

(56) References Cited

U.S. PATENT DOCUMENTS

| | | | |
|---|---|---|---|
| 4,102,574 A | * | 7/1978 | Wieder et al. ............... 356/367 |
| 4,710,030 A | | 12/1987 | Tauc et al. .................. 356/432 |
| 5,162,862 A | | 11/1992 | Bartram et al. ................ 356/5 |
| 5,706,094 A | | 1/1998 | Maris .......................... 356/432 |
| 5,748,318 A | | 5/1998 | Maris et al. ................. 356/381 |
| 5,918,191 A | * | 6/1999 | Patel ............................. 702/84 |
| 6,025,918 A | | 2/2000 | Maris .......................... 356/388 |
| 6,038,026 A | | 3/2000 | Maris .......................... 356/357 |
| 6,346,426 B1 | * | 2/2002 | Toprac et al. .................. 438/8 |
| 6,442,496 B1 | * | 8/2002 | Pasadyn et al. ............... 702/83 |
| 2002/0007422 A1 | * | 1/2002 | Bennett ....................... 709/246 |

* cited by examiner

*Primary Examiner*—Frank G. Font
*Assistant Examiner*—Roy M. Punnoose
(74) *Attorney, Agent, or Firm*—Harrington & Smith, LLP

(57) ABSTRACT

A metrology system has one or more central 'metrology servers' and one or more 'metrology slaves' The server delivers metrology 'pump/probe' signals to multiple slave systems allowing a reduction in the number of high-cost metrology components in the master system. In certain cases, multiple metrology components in the 'master' system may provide redundancy while still maintaining a beneficial cost benefit. Reliability can also be improved by using multiple lasers and multiple delay paths with a cross-point switch between them. If one sub-system goes down, the system may 'serialize' metrology operations and thereby maintain all systems running, although at somewhat of a reduced throughput. An important element of this invention is grouping all or most of the costly components in a centralized laser server, and issuing pump-probe pulse pairs to remote metrology heads through a light pipe or other conveyance, such as optical fiber. The remote metrology heads can thus be reduced in cost and complexity.

29 Claims, 6 Drawing Sheets

OPTICAL METROLOGY SYSTEM AND METHOD EMPLOYING LASER-SERVER SUPPLYING LASER ENERGY TO DISTRIBUTED SLAVE METROLOGY HEADS

CLAIM OF PRIORITY FROM A PROVISIONAL PATENT APPLICATION

This patent application claims priority under 35 U.S.C. §119(e) from Provisional Patent Application No.: 60/231,611, filed Sep. 11, 2000, the disclosure of which is incorporated by reference herein in its entirety.

FIELD OF THE INVENTION

This invention relates generally to optical metrology methods and apparatus and, more particularly, to those systems employing light sources that generate optical signals that are difficult to transmit over fiber optics, such as ultrafast, UV and/or high power or low light level optical signals, and relates as well to optical metrology systems that generate short pulses of laser energy for application to a surface of a sample, such as a surface of a silicon wafer.

BACKGROUND OF THE INVENTION

The increasing sophistication of semiconductor technology has resulted in a significant increase in the sophistication of the process equipment designed to produce the films used to manufacture semiconductor integrated circuits. One strategy to improve the performance of film deposition systems is to incorporate metrology into the process tools. The limitations of packaging size, as well as system cost and performance, are critical to the success of this application.

A first problem that remains to be solved is how to reduce the cost and size of metrology systems, particularly systems for integrated or insitu metrology. Presently, conventional metrology systems are self-contained and include all of the optical components required to make a measurement. Although some designs offer selected electronics or remote components to improve packaging, no cost sharing can be done across components. For integrated metrology it is important to offer capable metrology at an affordable value. What is needed is a technique to dramatically reduce the cost of metrology components.

A second problem that remains to be solved is how to reduce the cost and size of metrology without reducing the performance of the metrology. The best available technique for reducing the cost and size of metrology is to reduce the cost of the components and/or reduce the capability. One known type of system that takes this approach results in a capability embodied as a simple reflectometer. Although the reflectometer meets the cost and packaging goals of an integrated system, the capability and performance are limited. What is needed is an effective technique to bring complex and highly capable metrology to cost-effective integrated systems. Relatedly, in addition to reducing the cost there is a need to increase the reliability of the components.

A third problem that remains to be solved is how to increase the reliability of the system. Since reliability and availability are limited by component lifetimes and Mean Time Between Failure (MTBF) considerations, one technique to improve reliability is to provide redundant components. However, since the components that need to be made redundant may also be expensive, there may be a prohibitive cost penalty for providing redundancy in components such as lasers. What is needed is a technique to provide redundancy for high cost components without enduring an increase in the cost to the system.

A fourth problem that remains to be solved is how to deliver optical beams that are not well transmitted by fiber optics, such as ultrafast signals, to a remote metrology system. Current systems typically package an ultrafast laser with the metrology system because of the difficulty of transferring ultrafast signals. What is needed is a technique to transfer ultrafast signals, particularly with a metrology capability encoded in the signal, to a remote metrology system.

A fifth problem that remains to be solved is how to provide multiple different metrology capabilities in an inexpensive, integrated metrology system. Current systems must add different metrology capabilities (i.e. measurement systems) to the same package to deliver increasing measurement and diagnostic capabilities. What is needed is an ability to provide different metrology capabilities in a single, core metrology system.

A further problem that remains to be solved is how to provide for a mixed set of integrated and off-line metrologies at a reduced cost. Current metrology systems may combine multiple metrology capabilities by adding all of the components to one package. However, some of these components may be 'idling' for a substantial portion of the time since not all measurements are required at the same time. This idling of metrology components increases the cost of ownership of the metrology system since components have been paid for but are not being used. In some cases, valuable consumables may be expended while components are idling. What is needed is a method to make multiple metrology measurements available without incurring the increased cost and depreciation of the individual components.

Another problem that remains to be solved is how to provide metrology on demand. Some metrologies are needed only occasionally. Since the need is only occasional, it is wasteful to have all of the metrological capabilities available at all tools at all times. What is needed is a way to have different metrologies available as they are required by the user, without incurring the cost on a per-system basis.

Another problem that remains to be solved is how to improve the maintainability of a metrology system. Since space in a wafer fabrication facility (fab) is very expensive, metrology system designs are typically created that minimize the size in the fab. The most critical size component to reduce is the 'bay frontage', i.e,. the width of the unit to the operator. This demand on space may force compromises to be made in the maintainability of a tool. However, space behind the unit is more readily available. What is needed is a system in which most of the components of a metrology system can be placed in a location where floor-space is not so valuable such that more space can be devoted to facilitate maintenance access.

OBJECTS AND ADVANTAGES OF THE INVENTION

It is a first object and advantage of this invention to provide an improved metrology system that solves the foregoing and other problems.

It is a further object and advantage of this invention to provide an optical metrology system wherein one or more laser servers are employed to deliver pulses of laser energy to a plurality of metrology stations or heads, also referred to as metrology slaves, through a laser energy delivery system, such as optical fiber or a light pipe or conduit.

SUMMARY OF THE INVENTION

The foregoing and other problems are overcome and the foregoing objects and advantages are realized by methods and apparatus in accordance with embodiments of this invention.

This invention provides a system having one or more central 'metrology servers' and one or more 'metrology slaves'. The metrology server delivers metrology 'probe' signals to multiple slave systems allowing a reduction in the number of high-cost metrology components in the master system. In certain cases, multiple metrology components in the 'master' system may provide redundancy while still maintaining a beneficial cost benefit.

Economies of scale apply to the laser design since the efficiency of many of the laser processes are improved with increasing laser power. For example, frequency doubling efficiency improves as does the opportunity for continuum generation, such as providing white light from the laser for spectroscopic work. There is also a potential for recovering the discarded pump modulation (15%–30% of laser power recovery) when multiple systems are run from one laser.

Reliability can also be improved by using multiple lasers and multiple delay paths with a cross-point switch between them. If one sub-system goes down, the system may 'serialize' metrology operations and thereby maintain all systems operational, although at somewhat of a reduced throughput.

An important element of this invention is grouping all or most of the costly components in a centralized laser server, and issuing pump-probe pulse pairs to remote metrology heads. The remote metrology heads can be reduced in cost and complexity.

A first aspect of the present invention is a method for reducing the cost and size of an integrated metrology system by sharing the output of high cost components between multiple measurement modules by transmitting the generated light signals between multiple systems.

A second aspect of the invention is a technique for reducing the cost and size of the integrated metrology systems by time-sharing the source of the metrology signals between multiple systems.

A third aspect of the invention is using an excluded beam from a modulator in an apparatus to serve as the modulated signal for a second shared apparatus.

A fourth aspect of the invention is using multiple different master systems to feed multiple slaves designed to use the different signals to make different types of measurements.

A fifth aspect of the invention is using multiple redundant components in the 'master' system to improve the reliability, along with a cross-point switching or similar network to engage alternate sources upon one failed component.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
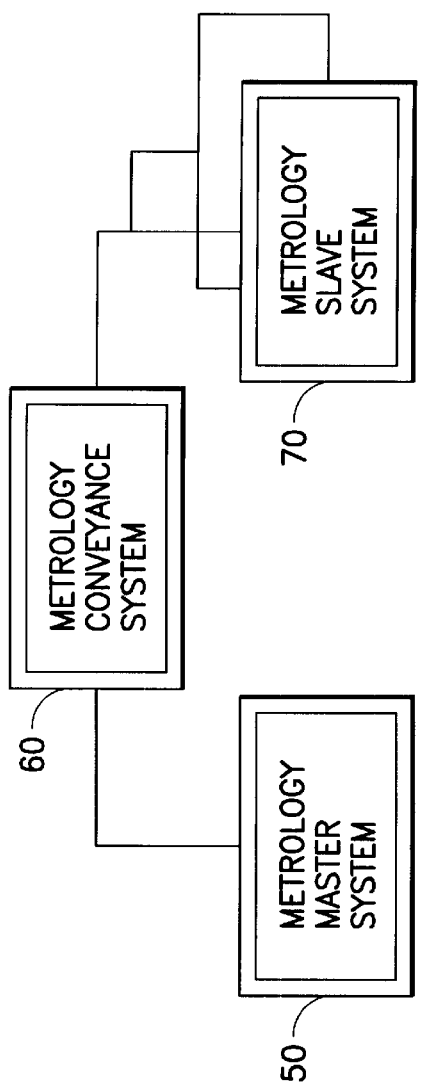
FIG. 1 shows metrology system that includes a metrology master system a metrology conveyance system and a metrology slave system in accordance with this invention.

Referring to FIG. 1, a metrology master system 50 is optically and electrically connected to a metrology slave system 70 by a metrology conveyance system 60. Metrology master system 50 contains many of the high-cost and lower reliability components required to complete the metrology system. The metrology conveyance system 60 includes the means by which the metrology 'beam(s)' are transferred to the measurement (slave) system 70. The measurement slave system 70 performs the actual measurement. The conveyance system 60 may also be used to convey the results of the measurement in optical form to the measurement master for analysis, or the analysis can be performed locally at the metrology slave system 70.

In operation, and assuming as a non-limiting case that the metrology system is used for making measurements on integrated circuit wafers, the slave system 70 receives a wafer to measure. The slave system 70 then either sends a message to the master system 50 to transmit the metrology beam or the master system 50 is continually transmitting the metrology beam. The metrology conveyance system 60, also referred to herein as a beam delivery system, then transfers the beam from the master system 50 to the slave system 70, and alternately may relay the measured beam back to the metrology master system 50. The optical beam generated by the master system 50 may be a continuous wave (CW) beam or a pulsed beam.

A measurement stage at the slave system 70 includes a test surface upon which the wafer is placed for measurements, and translation stages to provide wafer manipulation in three degrees of freedom. The preferred embodiment includes two linear stages arranged at right angles with respect to one another and in the plane of the test surface, and another linear stage to move the wafer in the direction of the measurement system.

Figure 2:
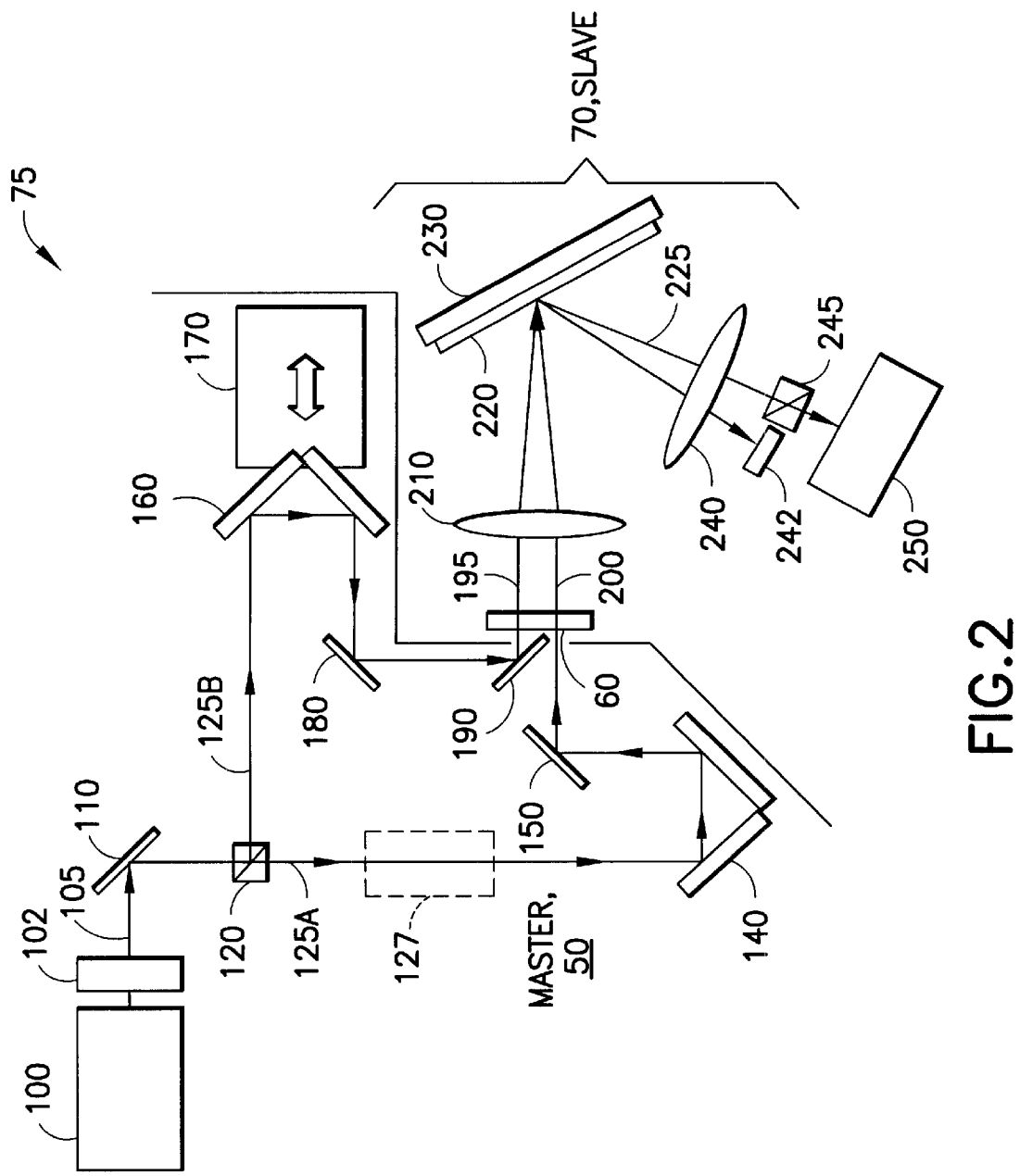
FIG. 2 is a schematic diagram of a first embodiment of a photoacoustic film thickness measurement system with optical paths shown.

FIG. 2 is a schematic depiction of a photoacoustic film thickness measurement system 75, with optical paths shown, that is constructed and operated in accordance with an embodiment of this invention. The photoacoustic measurement system 75 includes a pulsed light source 100, a sample stage 220, a vacuum chuck 230, a first probe beam steering mirror 180, a pump beam steering mirror 150, a first steering mirror 110, and a pump-probe beamsplitter 120. Additionally, the photoacoustic system 75 includes a probe retroreflector 160, a delay scanning stage 170, a beam dump 242, and a detector 250. Furthermore, photoacoustic measurement system 75 includes a linear pump-discriminating polarizer 245, a harmonic generator wavelength selector (wavelength selector) 102, a projecting lens 210, a collimating lens 240, a pump retroreflector 140, a EOM-polarizer assembly 127, and a second probe beam steering mirror 190.

The pulsed light source 100 may be a titanium-sapphire laser operating at 80 MHz and emitting light at 800 nm. The laser can also be alternatively configured with a frequency doubling birefringent crystal to emit laser beam 105 at 400 nm. The light source 100 could as well be an x-ray source, a synchrotron source, or an eximer laser source.

In accordance with the teachings herein, the pulse light source 100 and related components are located at the metrology master system 50, and are optically coupled to the metrology slave system 70 through the conveyance system 60, such as a light pipe that may contain adaptive optics for wavefront stabilization as well as vibration cancellation. In this embodiment both the probe and pump beams are conveyed through conveyance system 60, while in other embodiments the probe pulses (beam) 125B could be generated locally in the metrology slave 70 from the pump beam 125A.

In operation, pulsed light source 100 emits laser beam 105 that may be re-directed by first steering mirror 110. Pump/probe beamsplitter 120 splits the incident laser beam pulse (preferably of picosecond or shorter duration) into pump beam 125A and probe beam 125B.

EOM-polarizer assembly 127 rotates pump beam 125A at a frequency of several MHz and converts polarized and rotated pump beam 125A into amplitude modulated pump beam 200. Pump retroreflector 140 and pump beam steering mirror 150 deflect modulated pump beam 200 onto sample stage 220.

Probe beam 125B is transmitted to probe retroreflector 160 where delay scanning stage 170 is used to modify probe beam 125B profile at the output of retroreflector 160, forming time delayed probe beam 195.

Delayed probe beam 195 and modulated pump beam 200 are then delivered, in this embodiment of the invention, through the conveyance system 60, such as a light pipe, and then propagate through projecting lens 210. Sample stage 220 is held in place by vacuum chuck 230 and acts as a positioning unit for a wafer (not shown), and is preferably a multiple-degree of freedom stage that is adjustable in height (z-axis), position (x and y-axes), and tilt (θ), and allows motor controlled positioning of a portion of the sample relative to the modulated pump beam 200 and delayed probe beam 195.

The z-axis is used to translate the sample vertically into the focus region of the pump and probe beams, the x and y-axes translate the sample parallel to the focal plane, and the tilt axes adjust the orientation of the stage sample 220 to establish a desired angle of incidence for the probe beam 195.

Modulated pump beam 200 and delayed probe beam 195 propagate through collimating lens 240 where modulated pump beam 200 is gathered by beam dump 242. The pump-discriminating polarizer 245 isolates the reflected probe beam 225 from modulated pump beam 200, and detector 250 converts reflected probe beam 225 into a correction signal that is applied to dither AOM 205.

While the beam delivery system 60 is shown positioned before lens 210, it should be realized that it could be located elsewhere, such as after the beam splitter 120. In general, the placement of the beam delivery system 60 determines the type and number of components of the master system 50 and the slave system 70, and hence to a large degree the cost of each of these systems. In general, it is desirable to move as much cost and complexity into the master system 50, and to then share this system with a plurality of lower cost, lower complexity slave systems 70. However, in other embodiments it may be adequate to place only the laser 100 and associated components in the master system 60, and to place the remaining components in the slave system(s) 70.

Figure 3:
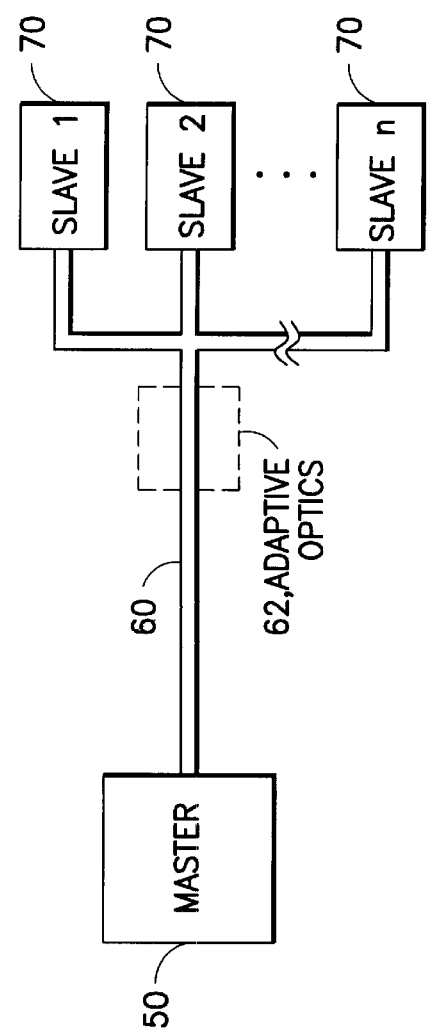
FIG. 3 is a block diagram of a distributed metrology system having a laser server (master) and a plurality of metrology heads (slaves), wherein pump-probe pulse pairs are delivered via an optical conduit.

FIG. 3 is an overall block diagram showing the master system 50 coupled to a plurality of metrology slaves 70 through the conveyance system 60, such as a light pipe or pipes and/or optical fibers. The light pipe may simply be hollow tubing. Preferably, adaptive optics 62 are provided for wavefront correction and vibration cancellation, if required. The light pipe may contain air, or it may be evacuated, or it may be filled with a selected gas, such as an inert gas.

The light pipe of conveyance system 60 could have a diameter in the range of about 10 mm to about 15 mm, and the adaptive optics 62 would typically include a wavefront sensor and a deformable mirror, as is known in the art. One suitable type of adaptive optical system is available from Flexible Optical BV, The Netherlands (www.okotech.com). For this embodiment it may be desirable to place a beam expander at the output of the laser 100 for expanding the laser beam 105 to a size that is correctable by the deformable mirror, which may have an aperture in the range of about 10 mm to about 50 mm. Expanding the beam 105 also tends to decrease the angular divergence.

Further in this regard it is noted that two separate optical paths may be provided, one for the pump and one for the probe, or a single, coaxial optical path may be provided. For this latter case discrimination between beams can be done by polarization state and/or modulation frequency.

Figure 4:
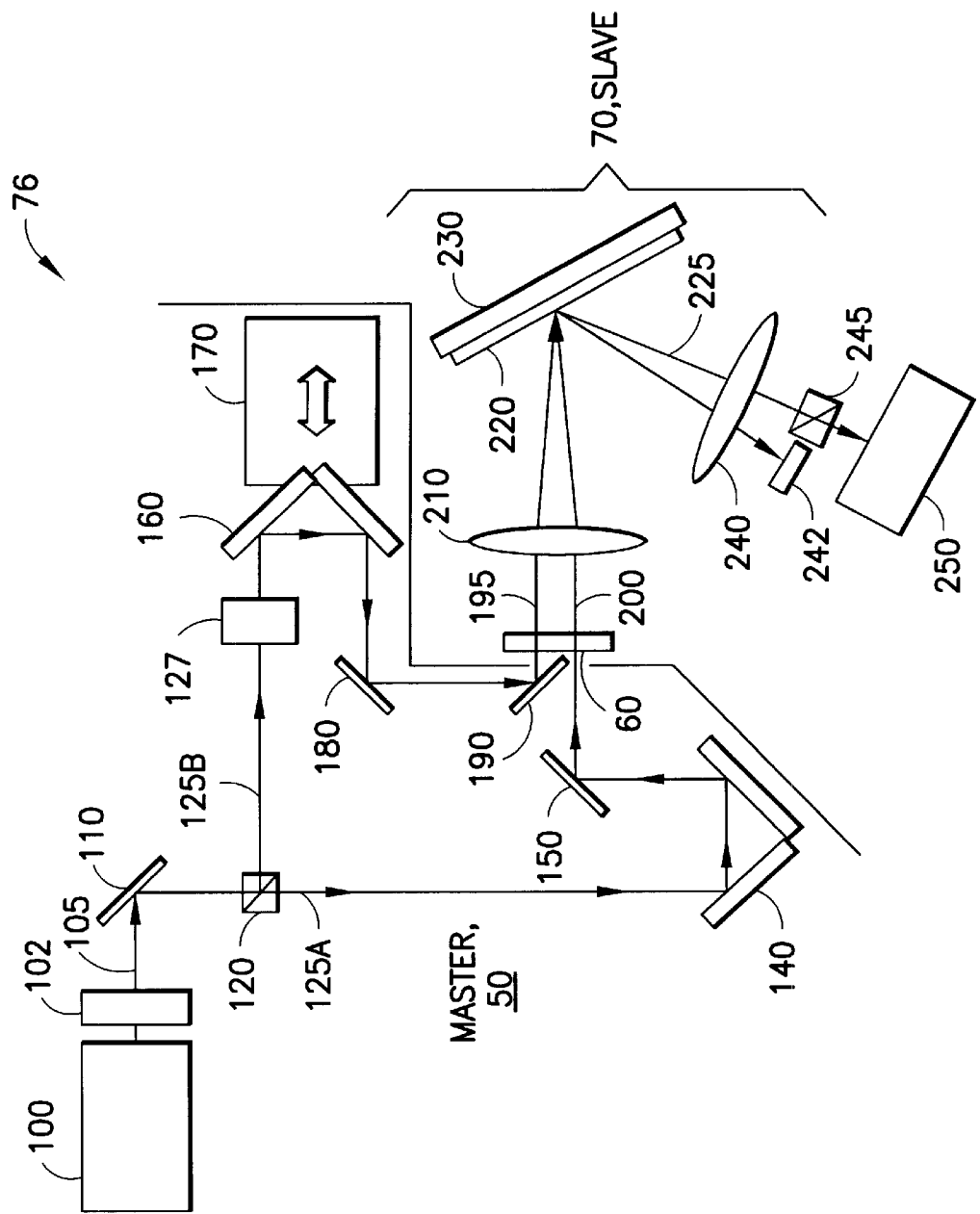
FIG. 4 is a schematic diagram of a second embodiment of a photoacoustic film thickness measurement system with optical paths shown.

FIG. 4 is a schematic of a second embodiment of a photoacoustic film thickness measurement system 76, with optical paths show, including the conveyance system 60, master metrology station 50, and the slave metrology system 70. In this embodiment the EOM-polarizer assembly 127 is placed in the probe beam 125B path between retroreflector and pump-probe beamsplitter 120. With the exception of the following operational differences, the schematic is identical to the FIG. 2 embodiment.

In operation, probe beam 125B enters EOM 130 where beam polarization is rotated between horizontal and vertical ($f_{DERIV}$), typically in the range of 10 kHz to 10 MHz. The sum (or difference) frequency is then determined ($f_{PUMP+/-}f_{DERIV}$). Beam shutter 132 remains open during the present mode.

Figure 5:
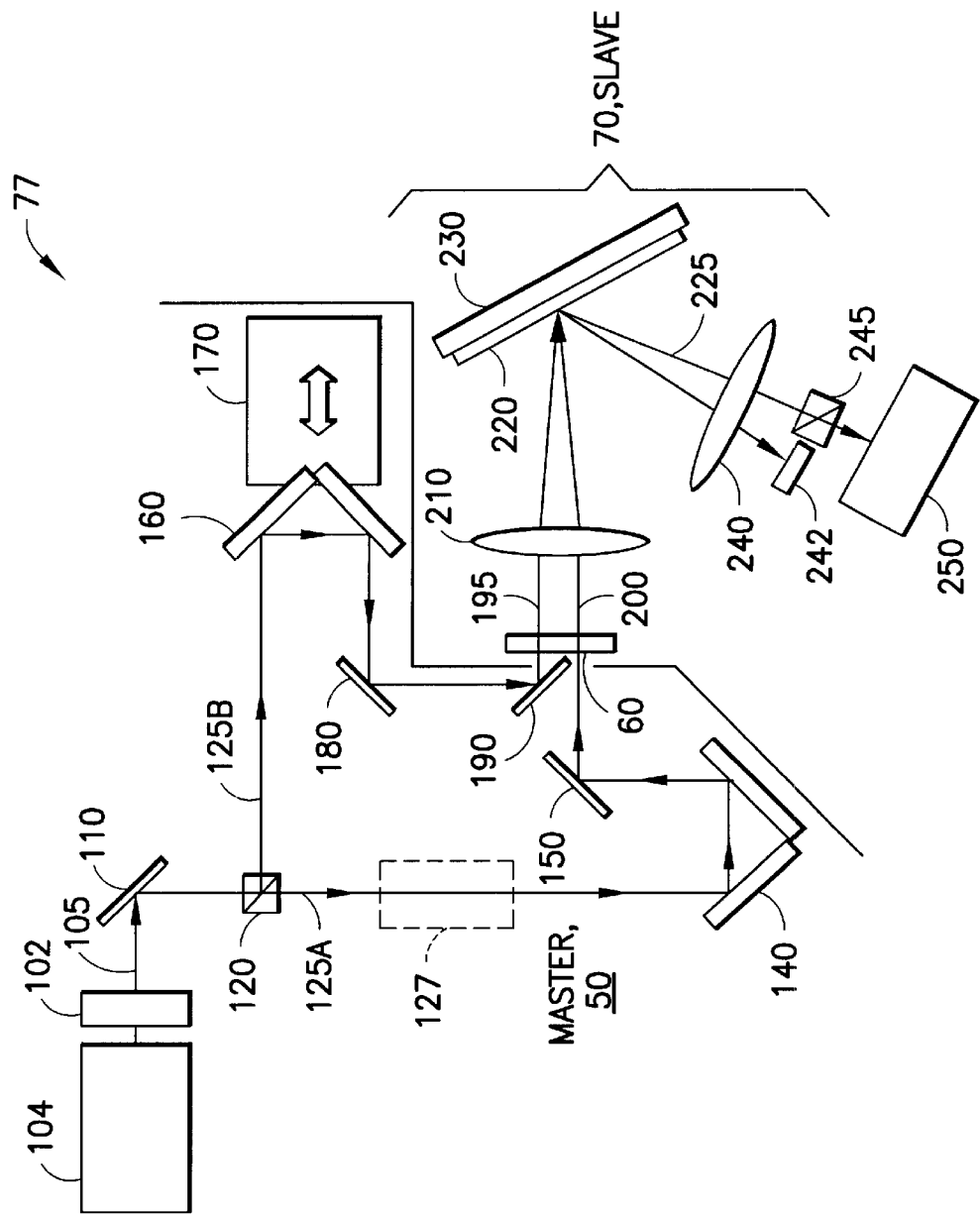
FIG. 5 is a schematic diagram of a third embodiment of a photoacoustic film thickness measurement system with optical paths shown.

In an alternate embodiment, a birefringent crystal assembly is used to generate a derivative capability, as depicted in the embodiment of shown in FIG. 5.

More particularly, FIG. 5 shows an alternate embodiment of the measurement stage of the present invention. This embodiment of the photoacoustic film thickness system 77 is identical to that of photoacoustic system 75 shown in FIG. 2, except that it includes birefringent crystal 104 in conjunction with laser light source 100 (not shown), where the laser 100 can also be configured with the frequency doubling birefringent crystal 104 to emit laser beam 105 at 400 nm. Note that in this case the birefringent crystal 104 is placed in the master metrology station 50, and is then shared by all or some of the metrology slaves 70, depending on their measurement requirements.

The operation of the present invention produces a system capable of implementing a multiple metrology system, where the high cost or large size components are separated from the low cost or small size components.

A method of operation for reducing the package size of a metrology system places some of the optical components so as to be separated from the measurement head(s) by a light delivery system, shown in FIG. 1 as the metrology conveyance system 60.

Figure 6:
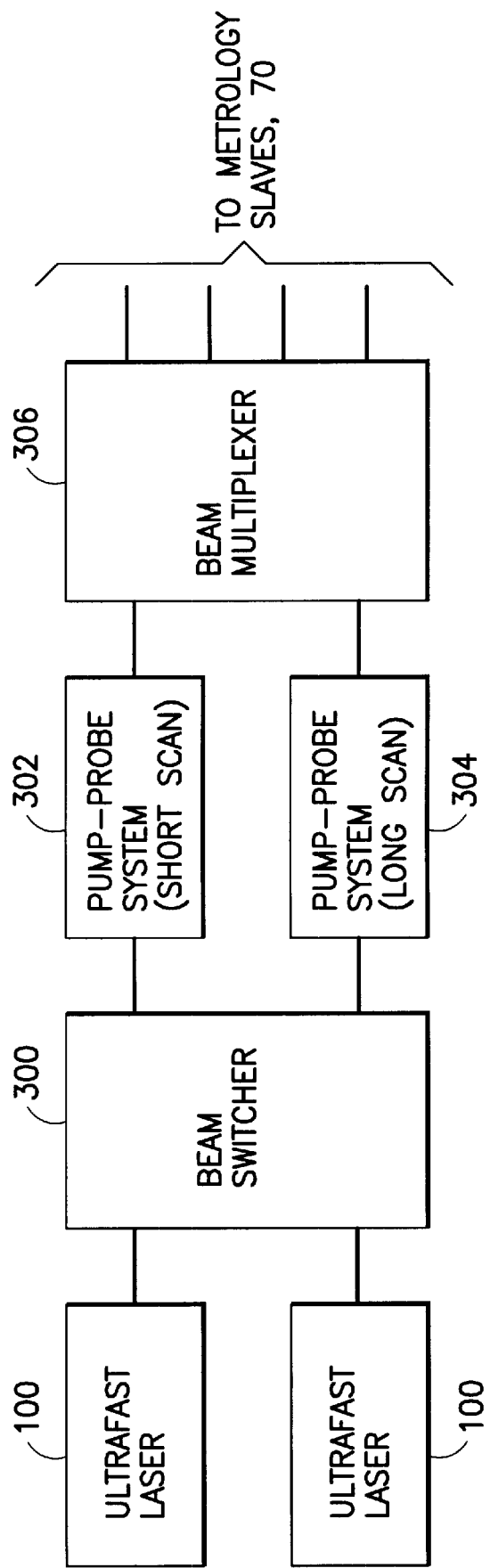
FIG. 6 is a block diagram of a distributed, master/slave metrology system showing improved reliability through the use of redundant components.

FIG. 6 is a block diagram of a distributed, master/slave metrology system showing an improvement in reliability through the use of redundant components, in this case multiple fast lasers 100. A beam switcher 300 selects the output from one of the lasers 100 for application to pump/probe beam generation systems (e.g., short scan 302 and long scan 304). The pump/probe pulse pairs are then applied via a beam multiplexer 306 to the metrology slaves 70.

Figure 7:
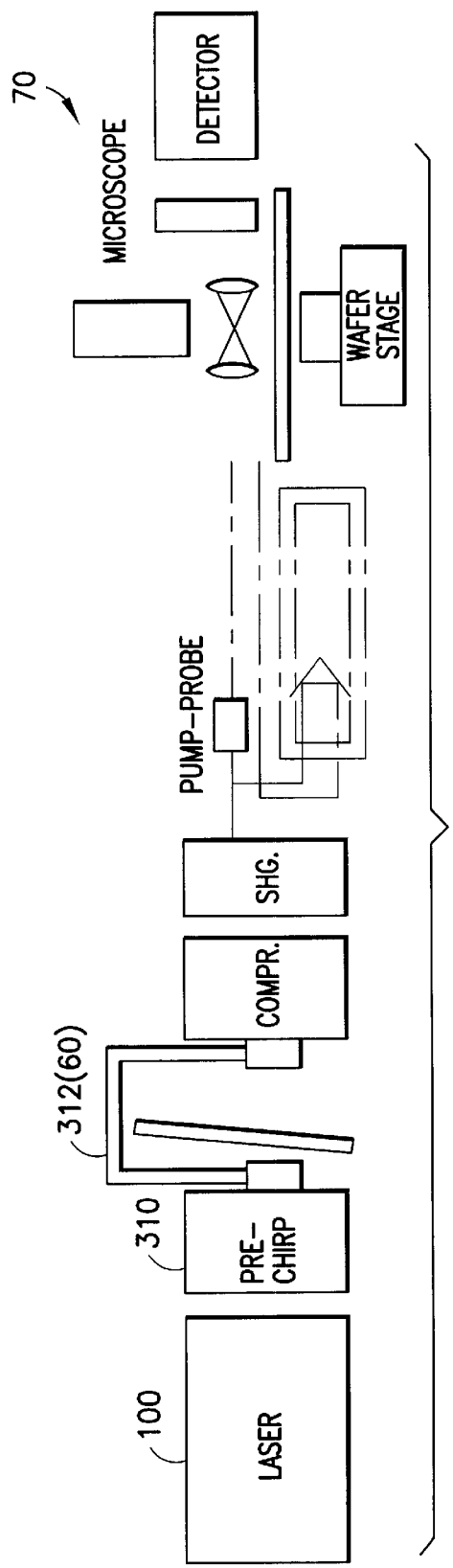
FIG. 7 is a block diagram of a distributed, master/slave metrology system showing the use of optical fiber for the beam delivery system.

FIG. 7 is a block diagram of a distributed, master/slave metrology system showing the use of optical fiber for the beam delivery system. In this case the pump beam can be pre-chirped at 310 before application to the optical fiber 312 and eventual application to the pump/probe generation system.

Figure 8:
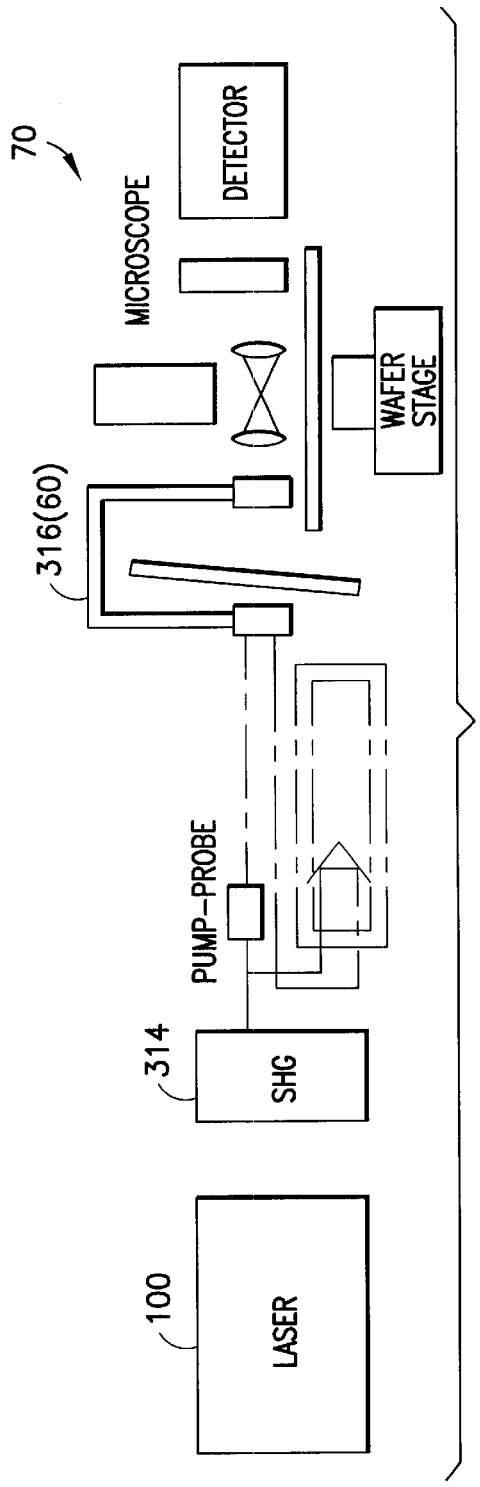
FIG. 8 is a block diagram of a distributed, master/slave metrology system showing the use of an air path (light conduit) beam delivery system.

FIG. 8 is a block diagram of a distributed, master/slave metrology system showing the use of an air path (light conduit) 316 beam delivery system. In this embodiment a Second Harmonic Generator (SHG) 314 can be used to frequency double the laser wavelength before application to the pump/probe generation system. The pump/probe pulse pairs are then delivered via the light conduit 316 of the beam delivery system 60 to the metrology slave(s) 70. The above described adaptive optics system 62 can be used in this embodiment as well.

While the invention has been particularly shown and described with respect to preferred embodiments thereof, it will be understood by those skilled in the art that changes in form and details may be made therein without departing from the scope and spirit of the invention.

What is claimed is:

1. An optical metrology system, comprising:
   a metrology master system comprising at least one source of optical sample measurement energy;
   a plurality of metrology slave systems where measurements are performed on samples each comprised of a semiconductor material; and
   a metrology conveyance system connected between said master system and said plurality of slave systems, said metrology conveyance system delivering said optical sample measurement energy to individual ones of said plurality of slave systems for application to said samples.

2. A system as in claim 1, wherein said master system comprises a plurality of lasers of the same type.

3. A system as in claim 1, wherein said master system comprises a plurality of lasers of different types.

4. A system as in claim 1, wherein said conveyance system delivers pump pulses.

5. A system as in claim 1, wherein said conveyance system delivers pump/probe pulse pairs.

6. A system as in claim 1, wherein said conveyance system is comprised of a conduit providing a path through at least one of the air or another environment, where the other environment comprises at least one of vacuum or a selected gas.

7. A system as in claim 1, wherein said conveyance system is comprised of optical fiber.

8. A system as in claim 1, wherein said metrology conveyance system is comprised of a conduit providing a path through the air and an adaptive optics system for performing wavefront shaping.

9. A system as in claim 1, wherein said metrology conveyance system is comprised of a conduit providing a path through the air and an adaptive optics system for performing vibration cancellation.

10. A system as in claim 1, wherein said metrology slave systems comprise optical detection systems for detecting probe light that is reflected from or transmitted through a sample.

11. A system as in claim 1, wherein said metrology master system comprises an optical detection system for detecting probe light that is reflected from or transmitted through a sample, the probe light being delivered through said metrology conveyance system from said metrology slave systems back to said metrology master system.

12. A method for performing optical metrology, comprising steps of:
    operating a metrology master system having at least one source of optical sample measurement energy to generate an optical beam;
    providing a plurality of metrology slave systems where measurements are performed on samples each comprised of a semiconductor material; and
    conveying said optical beam through a metrology conveyance system connected between said master system and said plurality of slave systems, said metrology conveyance system delivering said optical beam for use as sample measurement energy at said plurality of metrology slave systems.

13. A method as in claim 12, wherein said master system comprises a plurality of lasers of the same type.

14. A method as in claim 12, wherein said master system comprises a plurality of lasers of different types.

15. A method as in claim 12, wherein said metrology conveyance system conveys pump pulses or pump/probe pulse pairs.

16. A method as in claim 12, wherein said conveyance system is comprised of a conduit providing a path through at least one of the air or another environment, where the other environment comprises at least one of vacuum or a selected gas.

17. A method as in claim 12, wherein said conveyance system is comprised of optical fiber.

18. A method as in claim 16, wherein said conveyance system is further comprised of an adaptive optics system for performing at least one of wavefront shaping or vibration cancellation.

19. An method as in claim 12, wherein said metrology slave systems comprise optical detection systems for detecting probe light that is reflected from or transmitted through a sample.

20. An method as in claim 12, wherein said master metrology system comprises an optical detection system for detecting probe light that is reflected from or transmitted through a sample, the probe light being delivered through said metrology conveyance system from said metrology slave systems back to said metrology master system.

21. A distributed optical metrology system for characterizing samples comprised of integrated circuits, comprising:
    a source of optical sample measurement energy;
    a plurality of measurement stations where samples are characterized; and
    a conveyance system connected between said source and individual ones of said plurality of measurement stations, said conveyance system delivering said optical sample measurement energy to individual ones of said plurality of measurement stations for application to said samples.

22. A system as in claim 21, wherein said conveyance system is further comprised of an adaptive optics system for performing at least one of wavefront shaping or vibration cancellation.

23. A system as in claim 21, wherein said samples are characterized by measurement of a film disposed on a surface of the sample.

24. A distributed optical metrology system for characterizing samples comprised of semiconductor wafers, comprising:

at least one source of optical sample measurement energy;

a plurality of measurement stations where samples are characterized; and an optical conveyance system connected between said source and individual ones of said plurality of measurement stations, said conveyance system delivering pump pulse and probe pulse pairs derived from said at least one source to individual ones of said plurality of measurement stations for application to said samples.

25. A system as in claim 24, wherein said conveyance system is further comprised of an adaptive optics system for performing at least one of wavefront shaping and vibration cancellation.

26. A system as in claim 24, further comprising, at each of said measurement stations, an optical detector for detecting probe pulses that are one of reflected from or transmitted through a sample located at said measurement station.

27. A system as in claim 24, further comprising an optical detector for detecting probe pulses that are one of reflected from or transmitted through a sample located at each of said measurement stations.

28. A system as in claim 24, where said optical conveyance system is bidirectional for conveying probe pulses that are one of reflected from or transmitted through a sample located at said measurement station back to at least one optical detector that is separate from said plurality of measurement stations.

29. A system as in claim 24, where said pump pulses are modulated, and wherein corresponding probe pulses are variably delayed with respect to said pump pulses.

* * * * *